Sept. 1, 1931.  E. D. LEWIS  1,821,266
WATER TREATING APPARATUS AND METHOD
Filed Feb. 20, 1929
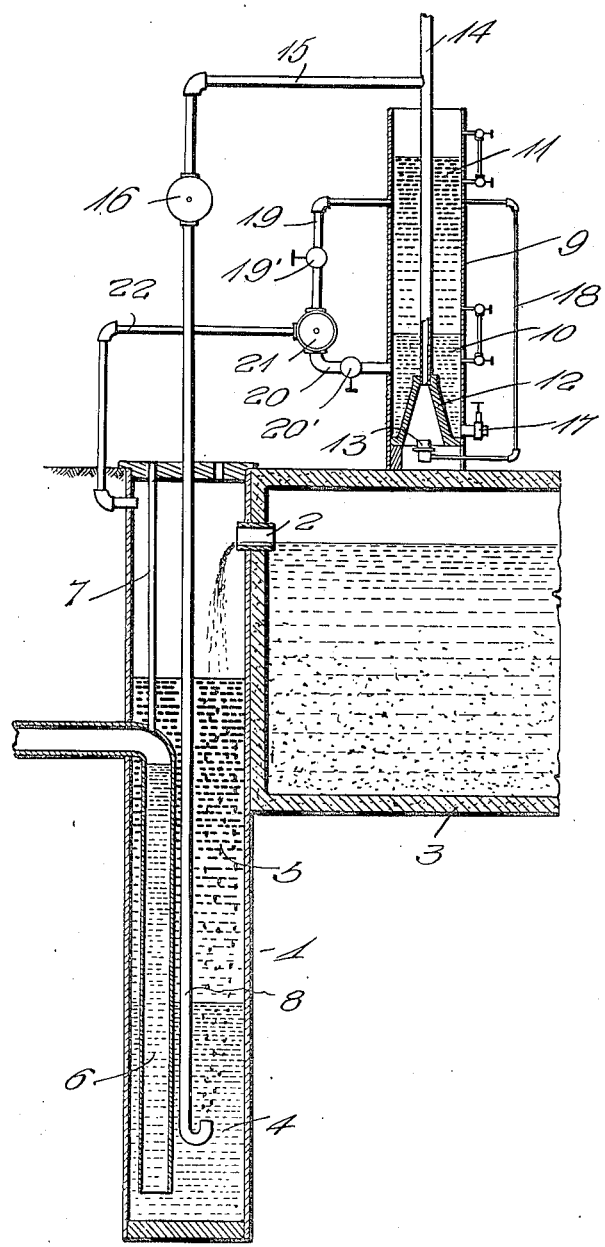
Inventor
Edward D. Lewis, Patented Sept. 1, 1931

1,821,266

UNITED STATES PATENT OFFICE

EDWARD DUDLEY LEWIS, OF ELMIRA, NEW YORK, ASSIGNOR OF ONE-HALF TO HERSCHEL L. GARDNER, OF ELMIRA, NEW YORK

WATER TREATING APPARATUS AND METHOD

Application filed February 20, 1929. Serial No. 341,441.

The invention aims to provide a new and improved apparatus and method for use in effectively killing germs in water, for instance, the water discharged from sewage disposal fields and the like, swimming pools, etc.

With the foregoing in view, the invention resides in the novel apparatus and method hereinafter described with reference to the accompanying drawing, in which a vertical sectional view of said apparatus is shown.

The drawing above briefly described illustrates the preferred form of construction and while such construction will be herein specifically explained, it is to be understood that within the scope of the invention as claimed, numerous variations may be made.

The numeral 1 denotes a liquid-tight well of any appropriate depth but by preference about forty-five feet deep. Near the upper end of this well, an inlet 2 is provided for the germ-laden water to be treated and in the present showing, said inlet 2 is the overflow from a sewage disposal field or tank, a portion of which is denoted at 3.

Within the lower portion of the well 1 is a column 4 of water, and superposed upon this water column is a column 5 of hydrocarbon oil, treated lubricating oil from the crank cases of motor vehicles, being preferably used because of the fact that it can be inexpensively purchased, yet is of adequate efficiency. The oil level is a considerable distance below the water inlet 2, so that the downwardly traveling water from this inlet may intermingle with and mix with the air in the upper portion of the well. This mixture of contaminated water and air surges downwardly through the column of oil 5 and in so doing, a hydrocarbon gas is generated which acts as a germ-killing medium. The mixture of oil and water in passing through the oil 5 necessarily entrains some of the latter, but as said mixture is received in the water column 4, most of the oil content so entrained will ascend through the water and again reach the oil column 5 for further use. An outlet 6 is provided from the lower end of the well 1 to an elevated point and discharge of water takes place through this outlet. The upper portion of this outlet is provided with a vent such as 7 to overcome any possibility of the discharging water siphoning out the contents from the well.

In addition to treating the contaminated water as above described, I treat it also in most instances with carbon-monoxide gas. This gas is conducted down the well through a gas line 8 and is discharged into the water column 4, and it has been found that this gas is in most instances sufficient to kill any germ life not killed by the water treatment above described. In unusual cases, it is also advisable to deposit a germ-killing chemical in the lower end of the well 1.

Most of the gases with which the water is treated, are absorbed either in the water column or by the water discharging through the outlet 6 and they eventually free themselves from the water, the gas emitted from the discharged water being directly received by the atmosphere and that released from the column 4 bubbling upwardly through the oil column 5.

Unique provision is made for treating low grade oil, for instance the oil drained from the crank cases of motor vehicles to condition it for effective use in the well 1. Then too, fuel consuming means which is utilized in treating the oil, is employed also to furnish the necessary carbon-monoxide gas for discharge through the gas line 8 into the water column 4. The preferred provision for these purposes, is shown.

A vertically elongated, open-top retort 9 is provided to receive a column 10 of water and a superposed column 11 of the oil to be treated. Within the water-containing portion of the retort 9, is a heating dome 12 containing an oil burner 13. A discharge pipe 14 is provided for the products of combustion from the dome 12, said discharge pipe extending upwardly within the retort to assist in heating the contents of the latter. A pipe line 15 and a pump 16 place the discharge line 14 in communication with the upper end of the gas line 8, so that upon operation of said pump, the products of combustion with their deadly carbon-monoxide fumes will be drawn from the dome 12, delivered to and downwardly forced through the gas line 8, from which they discharge into the water column 4 within the well 1.

The burner 13 is preferably of the efficient type shown in my U. S. Patent No. 1,620,111 and it serves to boil the water column 10 in the retort 9, causing the upward direction of steam through the oil column 11. Hence, the lighter oil is separated from the heavier and ascends, and all foreign matter is released from the oil to settle to the bottom of the retort 9, from which it may be removed through suitable clean-out means 17. The fuel oil for the burner 13 is preferably supplied from the upper portion of the retort 9 through a suitable fuel line 18. Upper and lower pipes 19—20 having valves 19'—20', a pump 21 communicating with these pipes, and a discharge pipe 22 from said pump, are employed to permit the forcing of either relatively light or comparatively heavy oil from the retort 9 into the well 1 whenever advisable. This function could of course be obtained by gravity if desired.

The discharge pipe 14 for the products of combustion is shown extending above the pipe 15 and open. This is done to prevent a "back-fire" in case the pump 16 should for any reason fail to operate.

It will be seen from the above that the invention involves a novel apparatus for treating water to kill germs therein, and that it also involves a unique method of treating this water. Briefly stated, this method in the specific embodiment illustrated, embodies the steps of mixing the germ-laden water with air, causing travel of this mixture of water and air through a quantity of hydrocarbon oil to generate the germ-destroying hydrocarbon gas, trapping of the oil entrained with the water and returning it to the above-named quantity, and the injection of an additional germ-killing gas into the water after passage through the oil.

It will also be observed that the invention embodies an effective apparatus and process for treating the low-grade oil in such manner as to render it usable for the desired purpose.

I claim:—

1. In a liquid purification apparatus, a liquid container, a gas line discharging into the liquid containing portion of said container; a retort to contain a column of water and a superposed column of low-grade oil, fuel-consuming means for boiling the water in said retort and thereby directing steam upwardly through the oil, oil-conducting means from said retort to said container, and means for forcing products of combustion from said fuel-consuming means to and through said gas line.

2. A structure as specified in claim 1; said fuel-consuming means consisting of an oil burner; and an oil supply line leading to said burner from said retort.

3. In a water treating apparatus, a retort to contain a column of water and a superposed column of oil, fuel-consuming means for boiling the water in said retort to cause upward travel of steam through the oil thereby preparing the latter for treating water, means for conducting the products of combustion from said fuel-consuming means to act as an additional water treating medium, and means for conducting the oil from the retort to a water treating container.

4. A structure as specified in claim 3; said fuel-consuming means consisting of an oil burner; and an oil supply line leading to said burner from said retort.

In testimony whereof I have hereunto affixed my signature.

EDWARD DUDLEY LEWIS.